(12) United States Patent
Meng et al.

(10) Patent No.: US 9,201,690 B2
(45) Date of Patent: Dec. 1, 2015

(54) RESOURCE AWARE SCHEDULING IN A DISTRIBUTED COMPUTING ENVIRONMENT

(75) Inventors: Xiaoqiao Meng, Yorktown Heights, NY (US); Jian Tan, Zhuzhou (CN); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/278,383

(22) Filed: Oct. 21, 2011

(65) Prior Publication Data

US 2013/0104140 A1     Apr. 25, 2013

(51) Int. Cl.
*G06F 9/46* (2006.01)
*G06F 9/48* (2006.01)
*G06F 9/50* (2006.01)

(52) U.S. Cl.
CPC ............ *G06F 9/4881* (2013.01); *G06F 9/5066* (2013.01)

(58) Field of Classification Search
None
See application file for complete search history.

(56) References Cited

U.S. PATENT DOCUMENTS

| | | | |
|---|---|---|---|
| 7,970,872 B2 | 6/2011 | Liu et al. | |
| 8,135,718 B1 | 3/2012 | Das et al. | |
| 8,209,695 B1 * | 6/2012 | Pruyne et al. | 718/104 |
| 8,230,070 B2 | 7/2012 | Buyya et al. | |
| 8,732,720 B2 | 5/2014 | Verma et al. | |
| 2003/0187907 A1 | 10/2003 | Ito | |
| 2007/0143765 A1 | 6/2007 | Aridor et al. | |
| 2008/0133474 A1 | 6/2008 | Hsiao et al. | |
| 2008/0263559 A1* | 10/2008 | Das et al. | 718/104 |
| 2010/0281166 A1 | 11/2010 | Buyya et al. | |
| 2010/0293551 A1 | 11/2010 | Ajima et al. | |
| 2011/0119680 A1 | 5/2011 | Li et al. | |
| 2011/0154341 A1 | 6/2011 | Pueyo et al. | |
| 2011/0167149 A1 | 7/2011 | Lee et al. | |
| 2011/0282982 A1 | 11/2011 | Jain | |
| 2012/0042319 A1 | 2/2012 | Hildrum et al. | |
| 2012/0110047 A1 | 5/2012 | Hildrum et al. | |
| 2012/0151292 A1 | 6/2012 | Rowstron et al. | |
| 2012/0198466 A1 | 8/2012 | Cherkasova et al. | |

(Continued)

FOREIGN PATENT DOCUMENTS

| | | |
|---|---|---|
| WO | 2011153242 | 6/2011 |
| WO | 2012027478 | 8/2011 |

OTHER PUBLICATIONS

Isard, Michael, et al., "Quincy: Fair Scheduling for Distributed Computing Clusters", Proceedings of the ACM SIGPOPS 22nd Symposium on Operating Systems Principles, Oct. 11-14, 2009, 20 pages, ACM, New York, New York, USA.

(Continued)

*Primary Examiner* — Gregory A Kessler
(74) *Attorney, Agent, or Firm* — Ference & Associates LLC

(57) ABSTRACT

Systems and methods for resource aware scheduling of processes in a distributed computing environment are described herein. One aspect provides for accessing at least one job and at least one resource on a distributed parallel computing system; generating a current reward value based on the at least one job and a current value associated with the at least one resource; generating a prospective reward value based on the at least one job and a prospective value associated with the at least one resource at a predetermined time; and scheduling the at least one job based on a comparison of the current reward value and the prospective reward value. Other embodiments and aspects are also described herein.

25 Claims, 9 Drawing Sheets

(56) References Cited

U.S. PATENT DOCUMENTS

| | | |
|---|---|---|
| 2012/0226639 A1 | 9/2012 | Burdick et al. |
| 2012/0284727 A1 | 11/2012 | Kodialam et al. |
| 2012/0330864 A1 | 12/2012 | Chakrabarti et al. |
| 2013/0024012 A1 | 1/2013 | Ballintine et al. |
| 2013/0024412 A1 | 1/2013 | Gong et al. |
| 2013/0031558 A1 | 1/2013 | Balmin et al. |
| 2013/0104135 A1 | 4/2013 | Cai et al. |
| 2013/0290976 A1 | 10/2013 | Cherkasova et al. |
| 2014/0019987 A1 | 1/2014 | Verma et al. |
| 2014/0215487 A1 | 7/2014 | Cherkasova et al. |

OTHER PUBLICATIONS

Zaharia, Matei, et al., "Job Scheduling for Multi-User MapReduce Clusters", Apr. 30, 2009, 18 pages, University of California, Berkeley, Technical Report No. UCB/EECS-2009-55, available at http://www.eecs.berkeley.edu/Pubs/TechRpts/2009/EECS-2009-55.html as of Oct. 18, 2011.

Dean, Jeffrey, et al., "Simplified Data Processing on Large Clusters", 4th Symposium on Operating Systems, Design & Implementation, Dec. 5, 2004, 13 pages, ACM, New York, New York, USA.

Polo, Jorda, et al., "Performance-Drive Task Co-Scheduling for MapReduce Environments", Network Operations and Management Symposium (NOMS), 2010 IEEE, Apr. 19-23, 2010, 8 pages, Osaka, Japan.

Wolf, Joel, et al., "Flex: A Slot Allocation Scheduling Optimizer for MapReduce Workloads", I. Gupta and C. Mascolo (Eds.): Middlware 2010, LNCS 6452, pp. 1-20, 2010, International Federation for Information Processing 2010, Laxenburg, Austria.

Tan, Jian, et al., "Coupling Task Progress and Using Limited Lookahead Control for MapReduce Resource-Aware Scheduling", IBM Research, Technical Report, 12 pages, Oct. 2011, available at https://researcher.ibm.com/researcher/view_pubs.php?person=ustanji&t=1.

Hindman, Benjamin, et al., Mesos: A Platform for Fine-Grained Resource Sharing in the Data Center, Sep. 30, 2010, 14 pages, University of California, Berkley, Technical Report No. UCB/EECS-2010-87, available at http://www.eecs.berkeley.edu/Pubs/TechRpts/2010/EECS-2010-87.html as of Oct. 18, 2011.

Anathanarayanan, G., et al., "Reining the Outliers in Map-Reduce Clusters using Mantri", Microsoft Research Technical Report, Jun. 2010, 24 pages, Techical Report MSR-TR-2010-69, Microsoft Corporation, Redmond, Washington, USA.

Dean, J., et al., "MapReduce: Simplified Data Processing on Large Clusters", Communications of the ACM, 50th Anniversary Edition, Jan. 2008, vol. 51, Issue 1, pp. 107-113, ACM, New York, New York, USA.

Hammoud, M., et al., "Locality-Aware Reduce Task Scheduling for MapReduce", 2011 Third IEEE International Conference on Cloud Computing Technology and Science (CloudCom), Nov. 29-Dec. 1, 2011, Athens, Greece, 7 pages.

Isard, M., et al., "Dryad: Distributed Data-Parallel Programs from Sequential Building Blocks", 2nd ACM SiGOPS/EuroSys European Conference on Computer Systems, Mar. 21-23, 2007, 14 pages, ACM, Lisboa, Portugal.

Zaharia, M., et al., "Improving MapReduce Performance in Heterogeneous Environments", Proceedings of the 8th USENIX conference on Operating systems Design and Implementation (OSDI'08), 14 pages.

Palanisamy, B., et al., "Purlieus: Locality-aware Resource Allocation for MapReduce in a Cloud", Proceedings of 2011 International Conference for High Performance Computing, Networking, Storage and Analysis, SC'11, Nov. 12-18, 2011, 11 pages, ACM, Seattle, Washington, USA.

Verma, A., et al., "ARIA: Automatic Resource Inference and Allocation for MapReduce Environments", HP Laboratories, Report HPL-2011-58, approved for publication in 8th IEEE International Conference on Autonomic Computing (ICAC'2011), Jun. 14-18, 2011, 11 pages, IEEE, Karsruhe, Germany.

Lin, Jimmy et al., "Of Ivory and Smurfs: Loxodontan MapReduce Experiments for Web Search", Nov. 2009, TREC 2009 DTIC Document, 12 pages, University of Maryland, USA.

Wang, Xiaowei et al., "Dynamic Split Model of Resource Utilization in MapReduce", DataCloud-SC'11, Nov. 14, 2011, 10 pages, Seattle, Washington, USA.

Zaharia, Matei et al., "Delay Scheduling A Simple Technique for Achieving Locality and Fairness in Cluster Scheduling", In Eurosys, Apr. 2010, 30 pages, Paris, France.

Dean, Jeffrey et al., "MapReduce: Simplified Data Processing on Large Clusters," OSDI'04 Technical Program, Oct. 3, 2004.

Derman, Cyrus et al., "A Sequential Stochastic Assignment Problem," Management Science, Mar. 1972, 8 pages, vol. 18, No. 7, Informs, Institute for Operations Research and the Management Sciences. Publisher contact http://www.jstor.org/action/showPublisher:publisherCode=informs.

Polo, Jorda et al., "Resource-aware Adaptive Scheduling for MapReduce Clusters," Proceedings of the 12th ACM/IFIP/USENIX International Conference on Middleware, Lisboa, Portugal, Dec. 12-16, 2011, 21 pages.

Sandholm, Thomas et al., "Dynamic Proportional Share Scheduling in Hadoop," JSSPP 2010, pp. 110-131, Springer-Verlag Berlin Heidelberg, Germany.

Guo, Zhenhua et al., "Investigation of Data Locality in MapReduce," Proceedings of the 2012 12th IEEE/ACM International Symposium on Cluster, Cloud and Grid Computing, CCGRID'12, Ottawa, Canada, May 13-16, 2012, 8 pages.

Tan, Jian et al., "Performance Analysis of Coupling Scheduler for MapReduce/Hadoop," The 31st Annual International Conference on Computer Communications: Mini-Conference, Orlando, Florida, USA, Mar. 25-30, 2012, 5 pages.

Kavulya, Soila et al., "An Analysis of Traces from a Production MapReduce Cluster," CMU-PDL-09-107, Parallel Data Laboratory, Carnegie Mellon University, Dec. 2009, 18 pages, Carnegie Mellon University, Pittsburgh, Pennsylvania, USA.

Condie, Tyson et al., "MapReduce Online," Proceedings of the 7th USENIX Conference on Networked Systems Design and Implementation, NSDI'10, San Jose, California, USA, Apr. 28-30, 2010, 16 pages.

Wang, Yandong, "Hadoop Acceleration Through Network Levitated Merge," SC11, Seattle, Washington, USA, Nov. 12-18, 2011, 10 pages, ACM Digital Library.

Dai, Jinquan et al., "HiTune: Dataflow-Based Performance Analysis for Big Data Cloud," Proceedings of the 3rd USENIX Conference on Hot Topics in Cloud Computing, Portland, Oregon, USA, Jun. 14-15, 2011, 15 pages.

Schwarzkopf, Malte et al., "The seven deadly sins of cloud computing research," Proceedings of the 4th USENIX Conference on Hot Topics in Cloud Computing, HotCloud'12, Boston, Massachusetts, USA, Jun. 12-13, 2012, 6 pages.

Chen, Fangfei et al., "Joint Scheduling of Processing and Shuffle Phases in MapReduce Systems," Proceedings of 31st Annual IEEE INFOCOM Conference, Orlando, Florida, USA, Mar. 25-30, 2012, pp. 1143-1151, IEEE Digital Library.

IP.COM, "Optimizing MapReduce Scheduling at the Task-Level," Prior Art Database Technical Disclosure, IPCOM000217108D, May 3, 2012, 6 pages.

Wierman, Adam et al., "Classifying Scheduling Policies with Respect to Unfairness in an M/GI/1." SIGMETRICS'03, San Diego, California, USA, Jun. 10-14, 2003, 12 pages, ACM Digital Library.

Polo, Jorda, et al., "Performance-Driven Task Co-Scheduling for MapReduce Environments", Network Operations and Management Symposium (NOMS), 2010 IEEE, Apr. 19-23, 2010, 8 pages, Osaka, Japan.

Teng, Fei et al., "Scheduling Performance of Real-Time Tasks on MapReduce Cluster," Proceedings of the International Conference on Human-centric Computing 2011 and Embedded and Multimedia Computing 2011, pp. 365-374, Springer Science+Business Media B.V., Netherlands, 2011.

Zaharia, Matei et al., "Job Scheduling for Multi-User MapReduce Clusters," Technical Report No. UCB/EECS-2009-55, Apr. 30, 2009, 18 pages, Electrical Engineering and Computer Sciences, University of California at Berkeley, available at http://www.eecs.berkeley.edu/Pubs/TechRpts/2009/EECS-2009-55.pdf.

\* cited by examiner

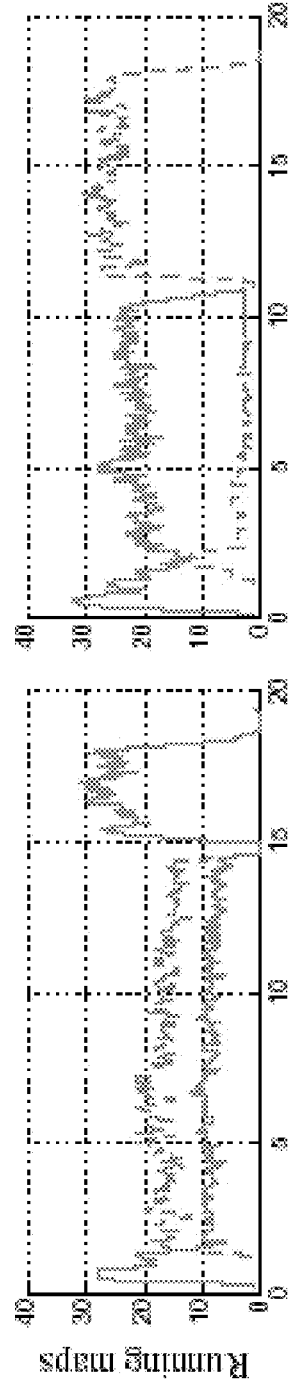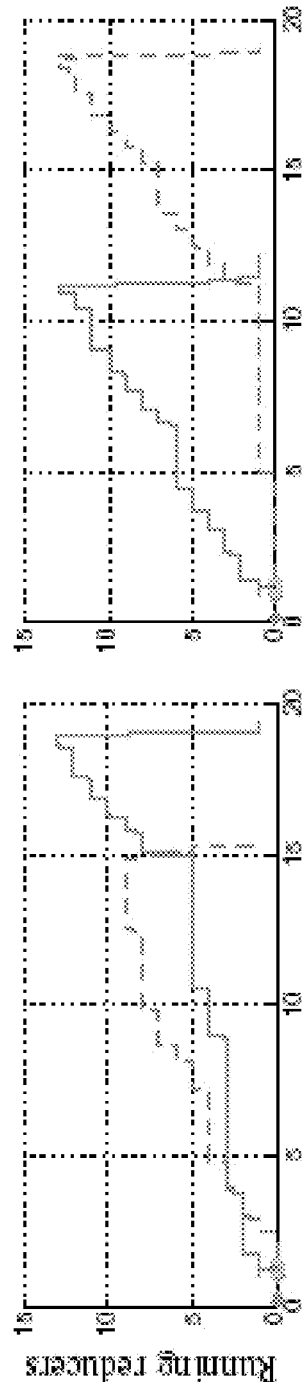
FIG. 8A — Weighted processor sharing
FIG. 8B — Weighted processor sharing
FIG. 8C — Shortest remaining time first
FIG. 8D — Shortest remaining time first

RESOURCE AWARE SCHEDULING IN A DISTRIBUTED COMPUTING ENVIRONMENT

FIELD OF THE INVENTION

The subject matter presented herein generally relates to data processing in a distributed computing environment.

BACKGROUND

Large and complex database systems are required to maintain the vast amount of data currently utilized by modern enterprises and associated applications. Processing the huge datasets stored in these systems often involves configurations comprised of specialized software frameworks operating within distributed computing environments. Such configurations provide the ability to execute parallel computations over multiple disks and processors. However, parallel computations and related processes require efficient and effective scheduling in order to realize the performance levels required by modern enterprise applications.

BRIEF SUMMARY

One aspect provides a computer program product comprising: a computer readable storage medium having computer readable program code embodied therewith, the computer readable program code comprising: computer readable program code configured to access at least one job and at least one resource on a distributed parallel computing system; computer readable program code configured to generate a current reward value based on the at least one job and a current value associated with the at least one resource; computer readable program code configured to generate a prospective reward value based on the at least one job and a prospective value associated with the at least one resource at a predetermined time; and computer readable program code configured to schedule the at least one job based on a comparison of the current reward value and the prospective reward value.

Another aspect provides a method comprising: accessing at least one job and at least one resource on a distributed parallel computing system; generating a current reward value based on the at least one job and a current value associated with the at least one resource; generating a prospective reward value based on the at least one job and a prospective value associated with the at least one resource at a predetermined time; and scheduling the at least one job based on a comparison of the current reward value and the prospective reward value.

A further aspect provides a system comprising: at least one processor; and a memory device operatively connected to the at least one processor; wherein, responsive to execution of program instructions accessible to the at least one processor, the at least one processor is configured to: access at least one job and at least one resource on a distributed parallel computing system; generate a current reward value based on the at least one job and a current value associated with the at least one resource; generate a prospective reward value based on the at least one job and a prospective value associated with the at least one resource at a predetermined time; and schedule the at least one job based on a comparison of the current reward value and the prospective reward value.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIGS. 8A-8D provide graphical results of the first and second test cases for embodiments described herein.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Enterprises are increasingly relying on dynamic and robust applications to carry out their operations. However, these applications generate large amounts of information that must be stored and processed. Although there have been advances in computer and server performance, for example, through increases in available processor speed, enterprises have found such advances inadequate to completely meet their needs. A practical solution has been to develop software and hardware frameworks that can handle the large datasets utilized by modern information technology systems.

An effective framework involves distributed parallel computing, which operates to disperse processing tasks across multiple processors operating on one or more computing devices such that parallel processing may be executed simultaneously. Important implementations of large scale distributed parallel computing systems are MapReduce by Google®, Dryad by Microsoft®, and the open source Hadoop® MapReduce implementation. Google® is a registered trademark of Google Inc. Microsoft® is a registered trademark of the Microsoft Corporation in the United States, other countries, or both. Hadoop® is a registered trademark of the Apache Software Foundation.

Figure 1:
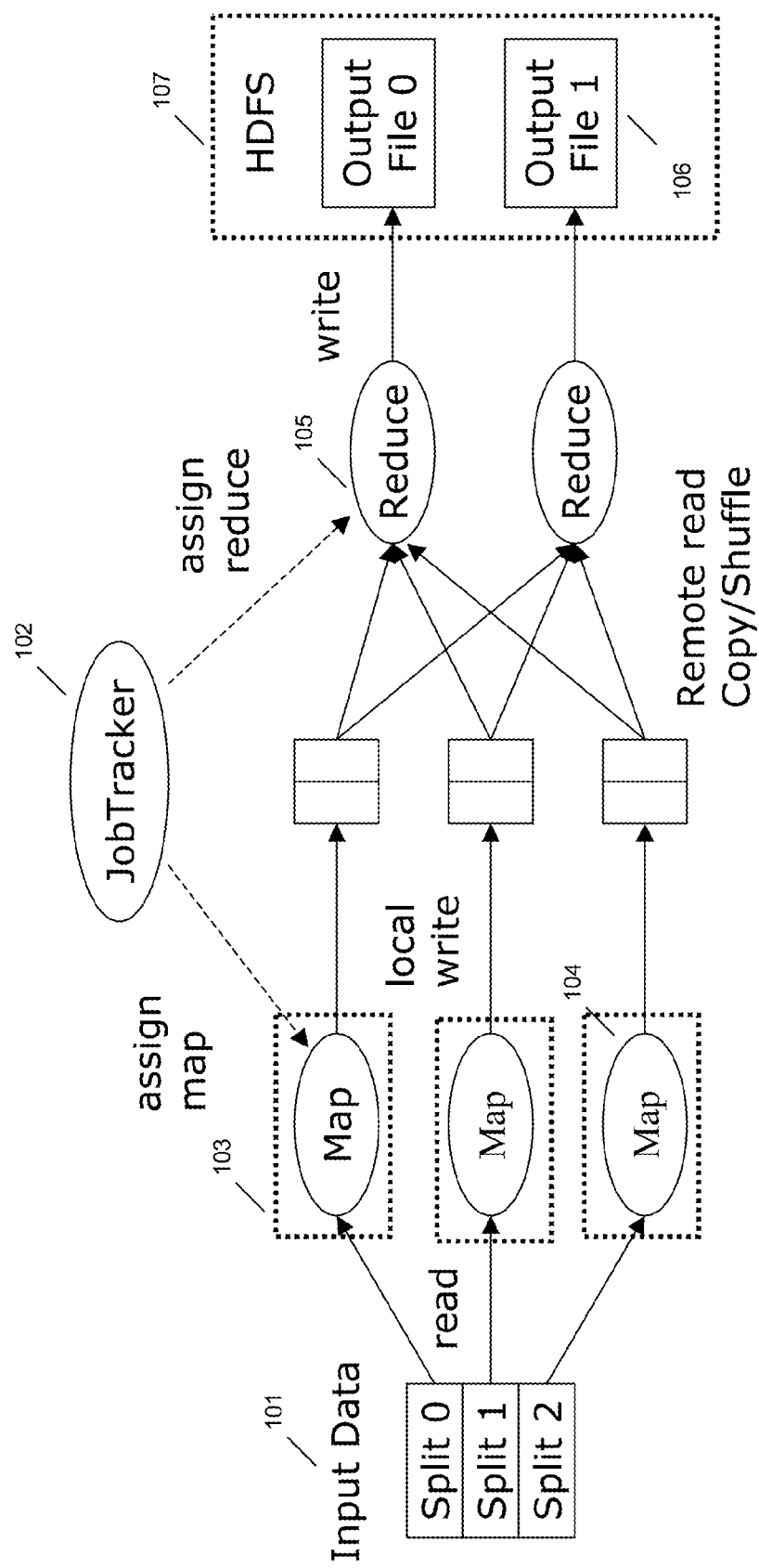
FIG. 1 provides an example of executing a single MapReduce job.

Due to their simplicity and flexibility, MapReduce implementations have become highly popular. In general, MapReduce is a framework for processing huge datasets by executing parallel computations on a large cluster. Running in a shared environment, distributed parallel computing jobs need to be scheduled with different constraints and varying workloads, thus presenting a challenging problem. Referring to FIG. 1, therein is provided an example of executing a single job in the Hadoop MapReduce implementation. A client first submits a job comprised of input data 101 that indicates code and input files. The input 101 may be in the form of a set of key/value pairs, such as the following two functions: map(k, v)→list(k1,v1) and reduce(k1,list(v1))→v2, where (k1,v1) is an intermediate key/value pair. The JobTracker 102 service breaks the input file into chunks and assigns tasks to TaskTracker nodes 103. Map tasks (i.e., map( )) 104 are executed, generating intermediate results in the form of key-value pairs for each block of input 101. After the map tasks 104 are complete, TaskTrackers 103 exchange map-output to build reduce( ) keyspace (not shown). In general, the reduce tasks 105 fetch the intermediate results according to keys and conduct reduce functions after receiving all of the intermediate results. The JobTracker 102 breaks the reduce( ) keyspace into chunks and assigns reduce tasks 105. The reduce task output 106 may be in the set of (k1,v2) pairs and may be stored within the distributed computing framework, for example, in a Hadoop Distributed File System (HDFS) 107.

Map and reduce phases may exhibit fundamentally distinguishing characteristics. In addition, these two phases exhibit complicated and tight dependency on each other. Map tasks are small and independent tasks that can run in parallel. To the contrary, reduce tasks essentially consist of three stages: (1) fetching data from every map task; (2) sorting and merging intermediate results according to keys; and (3) applying reduce functions to the sorted intermediate results. The intermediate results generated from map tasks need to be transferred to the reducers, for example, in a copy/shuffle phase. Only when a reducer fetches all of the intermediate data from every map function can it start the real reduce function. In addition, the fetch and shuffle phases in reduce tasks overlap with map tasks of the same job. More importantly, a long job that has launched a reduce task will not release the occupied slot until the reducer phase completes. These characteristics may lead to serious performance issues, such as starvation.

Figure 2:
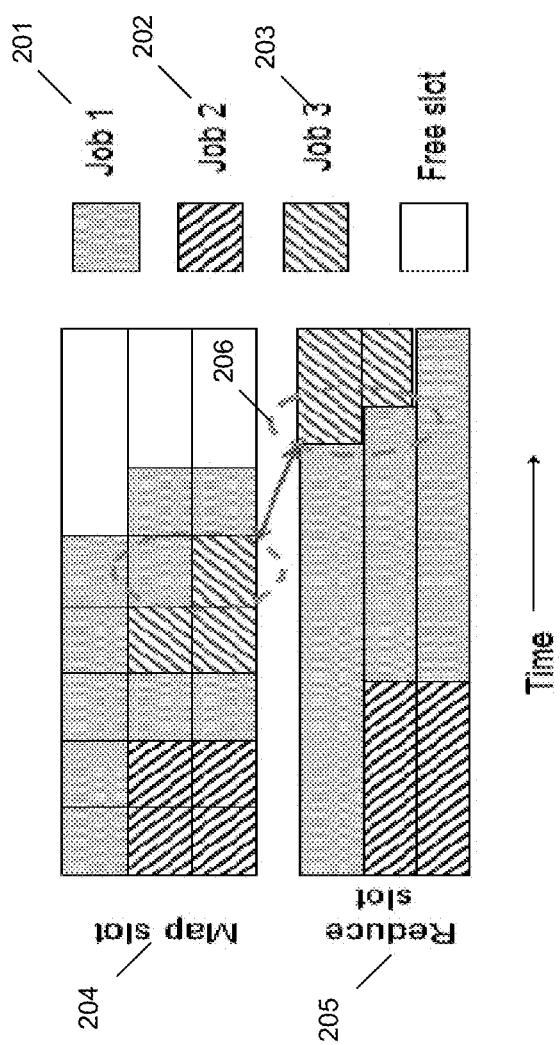
FIG. 2 provides an example of executing a multiple MapReduce jobs.

FIG. 2 provides example execution of multiple jobs in a MapReduce model. Three jobs 201, 202, 203 are scheduled for execution utilizing map slots 204 and reduce slots 205. In FIG. 2, job 1 201 has taken all reduce slots after job 2 202 has completed. Job 3 203 may start its map tasks upon submission; however, it has to wait until the reduce tasks of job 1 201 complete 206 until it can launch its own reduce tasks.

In the presence of multiple jobs, a scheduler is required to manage and share resources within the distributed parallel computing environment. Each framework implementation may be configured to operate with a number of different schedulers. Exemplary Hadoop schedulers include the default First In, First Out (FIFO) scheduler, Fair Scheduler (FAIR), Capacity Scheduler, and the FLEX Scheduler. In general, Hadoop job scheduling is performed on a master node and tasks are assigned to slave nodes in response to heartbeats measured every few seconds.

Although there are multiple models for different distributed parallel computing environments, and each model may operate using different schedulers, schedulers configured according to current technology still exhibit certain common features. For MapReduce models, the following are illustrative features common across various implementations:

(1) The available resources on the task trackers are abstracted using a "slot" device (also known as slacks) in an equitable manner. For example, Hadoop requires specification of the maximum number of map and reduce tasks, which may be denoted as mapSlot and reduceSlot, respectively, that can run concurrently on each task tracker. Current practice associates these two parameters with task trackers, independent of particular jobs.

(2) Map and reduce tasks may be scheduled separately. The separation of the joint scheduling in map and reduce phases may be implemented by dividing the total slots into disjoint map and reduce slots. For most existing schedulers, once a job is submitted, its map and reduce tasks are assigned according to their available respective slots, using a selection criteria. For example, the Fair Scheduler may be configured to launch reduce tasks greedily to the maximum when map tasks have achieved a certain level of progress.

(3) Distributed parallel computing models may collect a variety of information. For example, the Hadoop framework collects information including job and task progress, output bytes, CPU utilization, memory percentage, and I/O rates. However, existing models use this information mainly for reference after jobs have been completed. As such, this information is not fully exploited in optimizing scheduling decisions.

Similar features are present on other distributed parallel computing framework implementations. In addition, schedulers designed to optimize one metric will generally operate differently and produce different results from those designed to optimize one or more other metrics.

Embodiments provide for resource aware scheduling of jobs in a distributed parallel computing environment. According to embodiments, the progress of different tasks (e.g., map and reduce tasks) may be coupled through one or more functional relationships to match the progress of each other. A reward function may be configured according to embodiments for mapping available resources and performance specifications into a value. Embodiments provide that an optimal control may be found using the reward function, wherein the optimal control determines, inter alia, whether to launch certain tasks at a particular time and, if tasks will be launched, which specific tasks should be launched at the particular time. In addition, the reward function may be configured to evaluate data locality and balancing the stored intermediate results, for example, on the distributed computing system slave nodes.

The detailed description now turns to example embodiments configured using the MapReduce framework, and the Hadoop implementation of MapReduce in particular, for example, Hadoop version 0.22.0. Although embodiments described herein may be arranged utilizing the MapReduce framework, embodiments are not so limited as aspects and example embodiments described herein are applicable more broadly. One having ordinary skill in the art should thus understand that these might be easily applied to other contexts and to other systems that include elements of MapReduce or like systems. The MapReduce framework and the Hadoop implementation of MapReduce merely operate as exemplary models for describing embodiments provided in this detailed description. In addition, embodiments may be configured to operate using various hardware and software elements and configurations capable of implementing embodiments as described herein. For example, embodiments may be configured to operate utilizing distributed computing nodes running as instances on the internal International Business Machine Research Compute Cloud (RC2).

A Coupling Scheduler for scheduling jobs in a distributed computing environment is contemplated herein. The Coupling Scheduler may be configured according to embodiments to, inter alia, abandon the notion of slots when scheduling tasks (e.g., map and reduce tasks), couple the progresses of map/reduce tasks, and exploit the run-time information obtained from the distributed computing environments. A non-limiting example provides that slots may be generalized and refined by profiling each job by its CPU and memory requirements. In addition, the maximum number of slots (e.g., as determined by mapSlot and reduceSlot) may be equivalently translated to CPU or memory requirements. As such, the CPU and memory percentage of map tasks may be set to 1/mapSlot and reduce tasks may be set to 1/reduceSlot. Thus, when job profiles are not available, by default, these newly introduced parameters may be derived from the standard configuration, which may operate to make Coupling Scheduler compatible with standard system settings. Embodiments provide that the Coupling Scheduler may be configured to preferably launch reduce tasks when map tasks are still in progress. Copying and sorting the intermediate results of map tasks takes time and system resources. As such, overlapping map phase and copy/shuffle phase according to embodiments may operate save time and improve system performance.

As previously described, the fundamental interdependence between map tasks and reduce tasks can lead to starvation. In general, the intermediate results generated from map tasks need to be transferred to the reducers (copy/shuffle phase), and only when a reducer fetches all the intermediate data from every map task can it start the reduce function (reduce phase). In addition, the copy/shuffle phase and reduce phase are bundled together in reducers. Therefore, a long job that has launched a reduce task will not release the occupied resource until the reducer phase completes, which may starve other jobs even when the task tracker is being underutilized.

On one hand, launching malleable map tasks falls within the traditional scheduling framework, specifically, processor sharing, since jobs are decomposed into small and independent map tasks that can run in parallel. On the other hand, reduce tasks have different features that are difficult to apply using traditional processor sharing concepts, for example, reduce tasks are often long and cannot be preempted. A reduce task keeps running until completion through copy/shuffle and reduce phases, which potentially takes opportunities away from other jobs to run their own reduce tasks in the copy/shuffle phase. In addition, processor sharing does not apply for reduce tasks, at least in the same manner as processor sharing for map tasks, which represents one of the basic differences between map and reduce tasks. This notion may also serve to distinguish the Coupling Scheduler configured according to embodiments from existing schedulers, such as the Fair Scheduler.

Coupling Scheduler may be configured according to embodiments to launch reduce tasks (e.g., the number of running reducers) according to the progress of map tasks (e.g., the number of completed map tasks). Specifically, for the function $f: [0,1] \rightarrow [0,1]$ with $y=f(x)$, when fraction x of map tasks have started or completed, the scheduler can launch fraction y of reduce tasks, if possible. If there is a mismatch between the progress of map and reduce tasks of the same job, for example, a reduce task progress lags behind a map task progress, then this job should have a better chance to launch reduce tasks. However, if the progression of map and reduce tasks are in agreement, then this job should not be aggressive in acquiring resources that potentially can be utilized by other jobs.

The Coupling Scheduler may be configured according to embodiments to exploit information collected by the distributed computing environment. Non-limiting examples of such information include CPU utilization, memory percentage, data locality, and the progress of certain operations, including map and reduce tasks and related services. In addition, embodiments provide that the Coupling Scheduler may be arranged to optimize system performance with respect to different performance characteristics, such as fairness, promptitude, and efficiency. However, other performance characteristics are also contemplated herein, for example, as they become available within one or more particular distributed computing environments. In general, fairness emphasizes that users share the limited resources according to pre-assigned weights (generalized processor sharing); promptitude characterizes response time, such as the shortest remaining time first discipline that minimizes the average response time; and efficiency involves improving resource utilization, for example, increasing data locality and reducing network traffic, page in/out rate, and I/O rate.

Job scheduling may be configured to account for the performance characteristics of a particular distributed computing environment. According to embodiments, scheduling may balance the fairness, promptitude, and efficiency characteristics in view of system constraints and requirements. A reward function configured according to embodiments maps available resources and performance considerations into a reward. A limited lookahead control policy may be used in combination with the reward function to maximize the total reward along the time horizon. Embodiments provide that the reward and control policy optimizations may operate to make decisions concerning when, to which task tracker, and from which job the job tracker should schedule map and reduce tasks.

MapReduce schedulers may be designed to optimize one metric over another. Each type of scheduler will generally be different from others designed to optimize one or more different metrics. As such, embodiments provide tunable parameters to balance different aspects in the reward function, such as fairness, promptitude and efficiency. By tuning parameters according to embodiments, Coupling Scheduler may perform processor sharing, including first come first serve, shortest remaining processing time first, and combinations thereof.

The Coupling Scheduler may be configured according to embodiments to be based on a discrete time model ($t=1, 2, 3, \ldots$). At the beginning of every interval, the job tracker may determine whether to launch tasks on a slave and, if so, which tasks to launch. The use of a discrete time model may be derived from the characteristic of certain task trackers to periodically report statuses to the job tracker through heartbeats, and that the job tracker replies with task assignments in response to each received heartbeat. The reward function may be denoted herein by computeReward(job, resource). Embodiments provide that the reward function may be evaluated based on the measurements reported through the heartbeats and performance considerations specified by system applications. The contributions from individual components may be added to the reward function. As such, embodiments may set computeReward(job, resource)=R+S+D+L, where R represents the reward from resource aware, S represents the reward from scheduling policies, D represents the reward from data locality, and L represents the reward from load balance for intermediate data, respectively.

Figure 3:
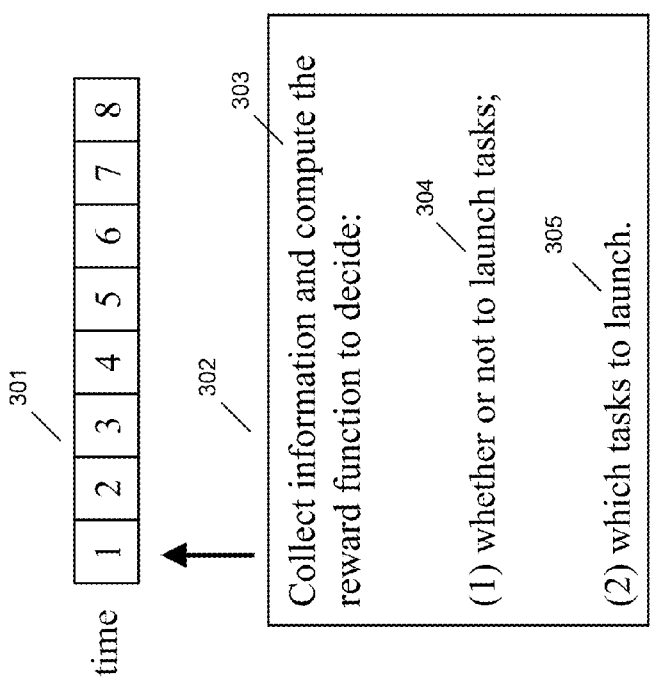
FIG. 3 provides an example of computing the optimal control according to an embodiment.

The implementation complexity of the reward function may be reduced according to embodiments through a heuristic solution configured to use a limited lookahead optimal control that operates to maximize the total reward along the time horizon. Referring to FIG. 3, therein is provided an example of computing the optimal control according to an embodiment. At each time interval 301, the optimal control process 302 may collect information and compute the reward function 303. This reward may be compared to a prospective reward that is computed using the estimated resources from the near future, for example, at a predetermined time in the future. The results of the reward function may be used to determine whether to launch tasks 304 and, if so, which tasks to launch 305.

Distributed computing environment jobs have diverse applications such as scientific computing, web crawling, log processing, video and image analysis, and recommendation systems. Such heterogeneous jobs with different resource requirements do not seem to fit the current uniform resource abstraction model. As such, embodiments may profile each job by its CPU and memory usage. In addition, embodiments may be configured to rely on simple estimates of the required memory, since precise values may not be necessary for the purpose of scheduling. Embodiments further provide for associating the two configuration parameters, mapSlot and reduceSlot, with jobs. As such, embodiments do not require more effort when tuning the newly introduced parameters for profiling the submitted jobs. If these new parameters are not specified explicitly along with the jobs for lack of information, then the default values of these new parameters may be computed automatically from the original configuration.

According to embodiments, CPU utilization and memory percentage measurements may be associated with both map and reduce tasks. The default CPU and memory percentages of map tasks may be set to 1/mapSlot and the default value for reduce tasks may be set to 1/reduceSlot. In a certain embodiment, mapSlot and reduceSlot are specified in a system configuration file according to a standard configuration. In addition, system monitoring tools, historical data, or system experience may be used to fine tune the CPU and memory measurement parameters. For example, jobs may be profiled using one or more sar (i.e., collect, report, or save system activity information) commands, for example, to determine the required CPU utilization.

In another example, the distributed computing framework may have one or more resource monitor plug-ins configured such that Coupling Scheduler may use the available measurements to estimate one or more resources for decision making. When such monitoring tools are disabled or unavailable, setting the parameters may depend on the number of map and reduce tasks that can run concurrently on each task tracker. The optimal values of these two parameters, mapSlot and reduceSlot, may be obtained from previous runs or trials that process the same types of jobs. Optimal values vary with each particular job, and, therefore, should be associated with jobs instead of only being associated with the cluster. Furthermore, in the presence of repetition of similar jobs on a distributed computing framework, new jobs may be profiled using past runs, which may operate to provide information for resource management.

The scheduling of jobs may be enhanced through the use of job signatures. An illustrative and non-restrictive example provides that the signature of job j, may be denoted by the set $(C_j^m, M_j^m, C_j^r, M_j^r)$. These values represent that a map task from job j requires CPU percentage $C_j^m$ and memory percentage $M_j^m$, while a reduce task from job j requires CPU percentage $C_j^r$ and memory percentage $M_j^r$.

Distributed computing environments may be comprised of multiple nodes arranged in various configurations. In certain configurations, the slave nodes may be homogenous, in other configurations, the nodes are not homogeneous. In general, if the slave nodes are not homogenous, the job signature may be extended to depend on not only the jobs but also the slave nodes. Embodiments provide that there are many processes for handling different types of nodes, including heterogeneous and non-heterogeneous nodes. For example, CPU and memory may be profiled using absolute values (e.g., bytes for memory and milliseconds for CPU time) instead of percentages. In addition, if the mapSlot value of one node is equal to 2 and the mapSlot value of another node is equal to 4, then $C_j^m$ for the second node can be computed to be half of the value for the first node.

A task tracker can report its available resources to an associated job tracker via a heartbeat. Embodiments may be configured to determine CPU utilization $C_i(t)$, available memory usage $M_i(t)$, and I/O rates at time t on a particular slave node i. In addition, $C_i(t)$ may denote the unused real-time CPU utilization, for example, in a Hadoop MapReduce model. In certain MapReduce implementations, measuring available memory usage requires more effort because the garbage collection in Java may not release the unnecessary memory in time. Embodiments provide for an estimation of memory usage sufficient for task scheduling, wherein $M_j^m$, $M_j^r$, and the number of tasks running on task tracker i may be used to estimate $M_i(t)$.

Figure 4:
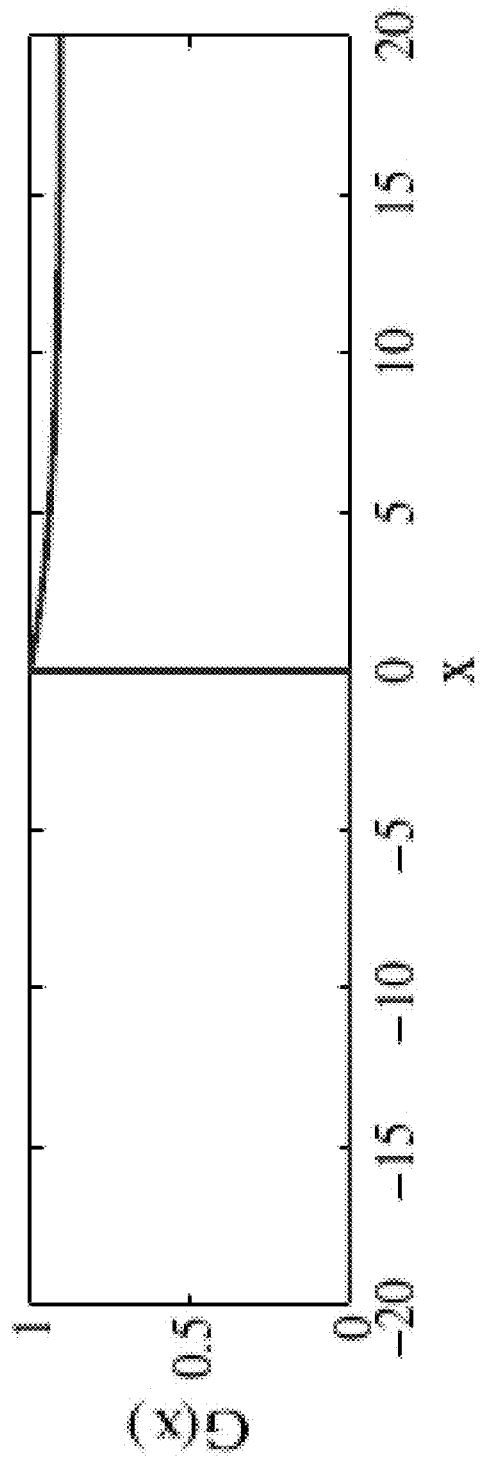
FIG. 4 provides graphical results for function $G(\bullet)$.

A function $G(\cdot)$ configured according to embodiments may be utilized to characterize how well a job can fit the available resources on a task tracker. Embodiments provide that this function may contribute additively to the total reward function computeReward(job, resource). A non-limiting example provides for setting $$G(x) = \begin{cases} 1 - 0.1e^{-x/5}, & x \geq 0 \\ 0, & x < 0 \end{cases},$$

the results of which are represented graphically in FIG. 4.

The function $G(\cdot)$ may be configured to take account of many factors. For example, a certain embodiment provides that $G(\cdot)$ may take account of the following two considerations: (1) a new map task from job j can fit on node i when $C_i(t) > C_j^M$ and $M_i(t) > M_j^M$; and (2) the tasks should be packed tightly on the nodes. According to embodiments, the contribution from the resource aware component is denoted by R, which may be added to the total reward. This reward R from assigning a map task from job j to the task tracker i may be computed according to the following:

$$R = G(C_i(t) - C_j^m) \times G(M_i(t) - M_j^m),$$

where $C_i(t)-C_j^m$ and $M_i(t)-M_j^m$ represent the remaining CPU and memory percentage, respectively, if task j were scheduled on slave node i.

As demonstrated in FIG. 4, G(x) is close to 0 on $(-\infty, 0]$ and 1 on $[0, \infty)$, and monotonically decreasing on $[0, \infty)$. This bipolar attribute describes whether a task can fit into a task tracker or not, and indicates a preference not to overuse the CPU resource. The monotonically decreasing property on $[0, \infty)$ may operate to pack the map tasks more tightly on task trackers, since a job that fits best can result in a larger reward. An illustrative and non-restrictive example provides that job 1, which requires $C_1^m$, and job 2, which requires $C_2^m$, may both be assigned to a task tracker i, where $C_i(t) > C_1^m > C_2^m$. In this example, it may be better to assign job 1 to this task tracker, since the available resource and the requirement match better. In addition, this example provides that $G(C_i(t) - C_1^m) > G(C_i(t) - C_2^m)$. Therefore, embodiments provide for scheduling decisions that maximize the reward, for example, by choosing tasks with profiles effectively matching the available resources.

Figure 5:
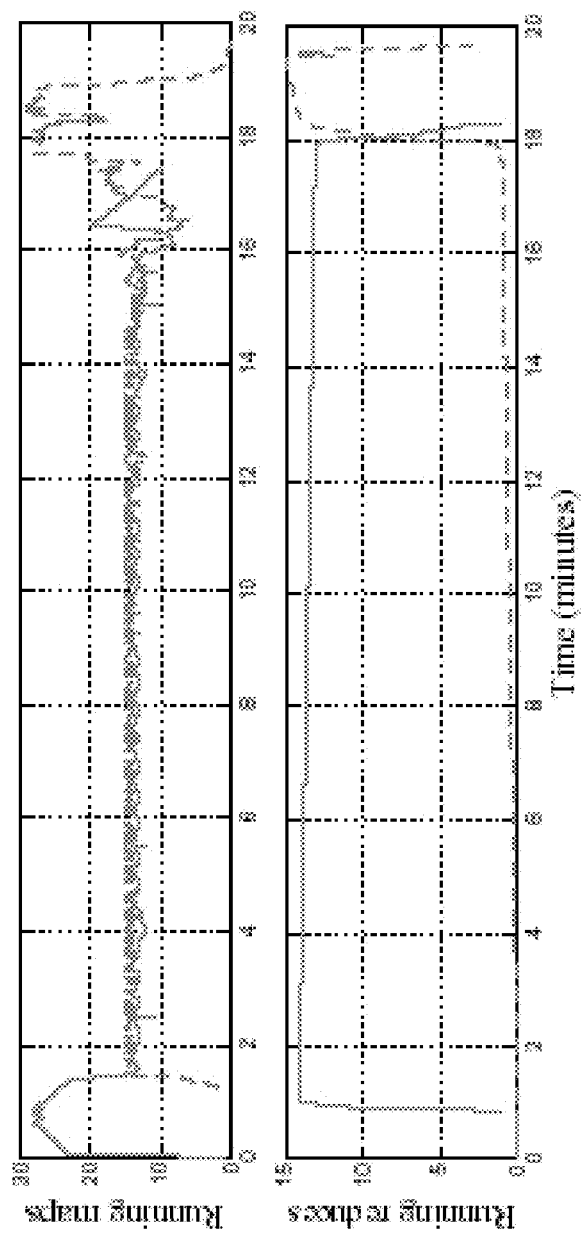
FIGS. 5A and 5B provide graphical illustrations of running two identical jobs on a MapReduce framework using the Fair Scheduler.

Schedulers structured according to existing technology allocate map and reduce tasks separately. FIGS. 5A and 5B provide graphical illustrations of running two identical Grep jobs on a Hadoop framework using the Fair Scheduler. For example, the Grep jobs may involve returning certain words (e.g., words starting with the letter "a" through words starting with the letter "g") from a large, digital encyclopedia. In the example of FIGS. 5A and 5B, the jobs are not started simultaneously, as a first job is started approximately 1 minute before a second job.

Even though the map tasks illustrated in FIG. 5A are conducted according to processor sharing, wherein, by default, these two jobs have the same priority weight in the Fair Scheduler, the reduce tasks execute first in first out. The main reason is that Fair Scheduler launches the reduce tasks to the cap number when map tasks have made certain progresses. Accordingly, the first job acquires all reduce slots while the second job loses them and applies for any available reduce slot after the first job releases. Thus a long job with a large number of reducers that arrives earlier potentially takes away the opportunities of other jobs that can run reduce tasks. This particular feature makes the traditional concept of processor sharing hard to apply for reducers. As such, simply delaying the launching of reduce tasks to a later time does not solve this problem. For example, even when the reduce tasks are started after all map tasks complete, the problem of first in first out for reduce tasks may still persist.

Embodiments provide for opportunistic processor sharing, wherein reduce tasks may be launched according to the progress of map tasks. According to embodiments, the function $f: [0,1] \rightarrow [0,1]$ with $y = f(x)$, described above, may be configured such that when fraction x of map tasks have started or completed, the scheduler can launch fraction y of reduce tasks, if possible. In addition, embodiments provide for the following mismatch process for the map and reduce progresses of a job, with job.desiredMaps (job.desiredReduces) denoting the total number of map (reduce) tasks for the particular job:

compute mismatch(job)
upper=(1−exp(−job.desiredMaps/5))*(1−exp(−job.desiredReduces/5));
unit=upper*job.desiredMaps/job.desiredReduces;
mapProgress=(job.finishedMaps+job.runningMaps)/unit;
redProgress=job.finishedReduces+job.runningReduces;
mismatch=mapProgress−redProgress.

The mismatch function may operate to measure the distance between the map and reduce progresses. If there is a mismatch between the map and reduce progresses, for example, the reducer progress lags behind map progress, then this job may have a better chance to launch reduce tasks. If the progresses of map and reduce tasks are in agreement, then this job may not necessarily be aggressive in acquiring the resource that potentially can be utilized by other jobs. Coupling Scheduler loops over all the jobs present in the system and finds the one with the largest mismatch value to launch a reduce task. In addition, embodiments provide for scheduling jobs comprised of one or more dependent sub-jobs, wherein scheduling sub jobs may operate through coupling the progress of at least one sub job through one or more functional relationships to match the progresses of each other.

Figure 6:
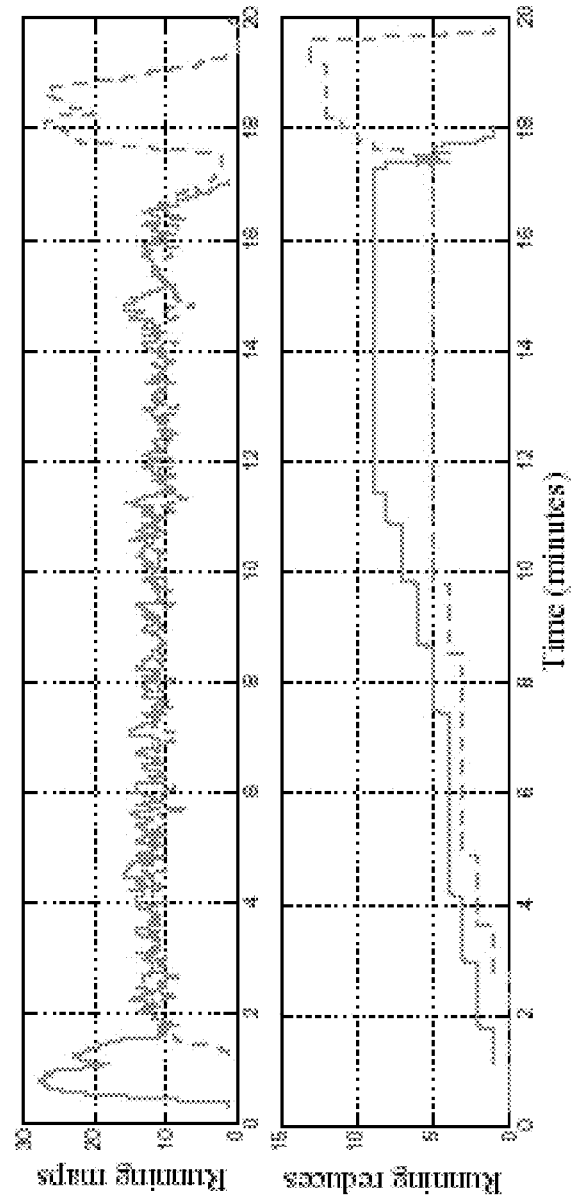
FIGS. 6A and 6B provide graphical illustrations of running two identical jobs using the Coupling Scheduler configured according to an embodiment.

Referring to FIGS. 6A and 6B, therein provides a graphical illustration of running two identical Grep jobs using the Coupling Scheduler configured according to an embodiment. The Grep jobs plotted in FIGS. 6A and 6B may be the same type of jobs depicted in FIGS. 5A and 5B, for example, for comparative purposes. As indicated in FIG. 6B, the two reduce tasks perform some sharing. The first job can run more reducers than the second job because the first job is submitted earlier and the map progress is always larger for the first job as compared to the second job. In addition, reduce tasks from different jobs may share launch opportunities.

The Coupling Scheduler may be configured according to embodiments to optimize the total reward along the time line. According to the conventional greedy process, tasks may be assigned whenever available resources are sufficient. However, this approach in general does not provide an optimal solution. As such, embodiments provide for scheduling certain tasks later than is possible. For example, tasks may be scheduled later due to certain task or distributed computing environment factors, including, but not limited to, fairness and data locality.

One particular embodiment, for example, may focus on CPU usage in the context of fairness. Embodiments provide that fairness may be comprised of a weight or value for each job that indicates how the job shares the limited resources with other jobs. For example, $C_i(t)$ may denote available CPU utilization on node i at time t. The map tasks of two jobs, jobs 1 and 2, may require CPU usage $C_1^m$ and $C_2^m$ with $C_1^m < C_i(t) < C_2^m$. A scheduler may operate to determine whether job 1 should be scheduled right away. An exemplary scenario may provide that job 2 may be starving, and in the next few intervals, say t+1, t+2, and t+3, it is expected that node i is very likely to release some CPU resource such that $C_i(t+2) > C_1^m$. According to this scenario, a scheduler may decide not to schedule job 1 because it is more beneficial to wait until later to explore the opportunity for scheduling job 2.

Another non-limiting example focuses on data locality, wherein at time t on node i, job 1 does not have a local task, job 2 has a local task, and node i can only run a task from job 1 at time t. However, if in the next few intervals it is expected that node i is very likely to release more computing resources such that it can run a task from job 2, then it may be more beneficial to postpone the scheduling of jobs until job 2 may be run. Jobs having local tasks may increase the reward function such that the reward function may be utilized to reflect the contribution from data locality. However, embodiments further provide for a balance between postponing jobs to achieve data locality and running a current task that may not have data locality. An illustrative and non-restrictive example provides that the balancing may be configured as an exploration and exploitation problem, which may fall into the framework of stochastic dynamic programming.

Scheduling map tasks based on factors may be implemented using limited lookahead heuristics. A non-limiting example provides that, for each decision, the scheduler may be restricted to the task tracker that sends the heartbeat, and an estimate is made of the available resources in a predetermined time period T (e.g., T=9 seconds). If the total reward after the predetermined time period on this task tracker equals a tunable threshold value C (e.g., C=0) more than the reward of launching the task right away (denoted herein by the function rewardNow), then a later opportunity to run the subject task may be explored. The process may be depicted as follows, wherein the data structure mapList contains the list of possible map tasks that can be launched in response to the received heartbeat:

```
Estimate the available resource (resNew) on the task tracker after T
seconds:
For each job in the queue
    If computeReward(job, resNew) > rewardNow + C
        mapList=NULL
    Endif
Endfor.
```

Future available resources may be estimated according to certain embodiments, for example, through predicting the remaining processing time $T_j^r$ for each running map task of job j. An illustrative and non-restrictive example provides for $T_j$ as the average processing time and $T_j^o$ as the obtained processing time of a map task from job j. One particular embodiment provides for estimating $T_j^r$ by utilizing the fraction of input data read $\eta>0$, which is a value reported in Hadoop, for a map task. Assuming a constant data read rate, the following estimation may be determined: $T_j^r=(1-\eta)T_j^o/\eta$. Another embodiment provides for first estimating $T_j$, and then predicting $T_j^r=\max(T_j-T_j^o)$. In addition, embodiments may determine estimations using the exponential weighted moving average.

According to a non-limiting example, $T_j$ may be set to the processing time of the first finished map task of job j, and whenever a map task from job j completes successfully and reports its total processing time $T_x$, $T_j$ may be updated according to the following: $T_j \leftarrow p \times T_j + (1-p) \times T_x$ where p, for example, can take a value 0.7. The estimation processes configured according to embodiments may be used to determine whether the running map tasks on a task tracker can possibly finish in a particular time interval (e.g., T=9 seconds), which can be used to estimate the resources that will be released on a particular slave node. In general, embodiments may estimate the distribution of the completion times and may subsequently compute the expected reward after the time interval, for example, using the standard approach such as those employed in stochastic dynamic programming.

As previously described, data locality may be a component of a reward function arranged according to embodiments, which generates a reward (which may be denoted herein by D) that may be added to computeReward(job, resource). Running a map task on a node that contains the input data can take the data directly from the disk and reduce network traffic. This can greatly improve system performance on a large cluster, since network bandwidth is far smaller than the disk bandwidth. On the other hand, the intermediate data generated from map tasks may need to be transferred through the network to nodes where the reduce tasks reside. Embodiments provide for scheduling that, through a facility function, takes data locality into account in the reward, which places map tasks closer to the input data and the intermediate data closer to the reducers.

The facility function may take the form hasLocalTask(job, taskTracker), and may operate to determine whether a job has a local task on a task tracker or not. Embodiments may be configured to add more to the reward if local map tasks exist and at least one reducer of the job resides on the same node. If only local map tasks exist on the node, the reward D has a smaller value. Otherwise, set the reward to zero with probability p (using rand to denote a uniform random variable on [0,1]). The value of p may be set to the ratio of the number of slave nodes that have local map tasks and the remaining map tasks of this job (denoted by job.pendingMaps). This choice of p is based on the fact that if the number of pending map tasks (job.pendingMaps) is much larger than the number of nodes that have local map tasks (numLocal), then even when there is no local task on the given node, it can still be beneficial to launch a remote map task immediately. On the other hand, if job.pendingMaps is smaller than numLocal, then the scheduler may better wait for the heartbeat from another slave node to launch a local map task for this job. When these two values are comparable, embodiments may use a randomized control for assigning map tasks. This is because the same trunk of data can have multiple replicas on several nodes, and thus all these nodes can report to have local tasks even though this trunk of data can only be processed by one map task. In this case, tracking the details of all tasks incurs computations requiring significant resources. The following provides an example embodiment:

```
If there is a local task on the task tracker, then:
    If a reduce task of this job also runs on this task
    i.e., tracker(hasReduce(job, tt)==TRUE)
        Set D = 0.4
    Else:
        Set D=0.2
Else:
    numLocal←0
    For tt on the set of all task trackers
        If hasLocalTask(job, tt)
            numLocal ← numLocal+1
        Endif
    Endfor
    If rand ≤ numLocal/job.pendingMaps
        computeReward(job, resource) ←0
    Else
        If hasReduce(job, tt)==TRUE
            Set D=0.4
        Else
            Set D=0.2
        Endif
    Endif
```

Experiments indicate that such embodiments may generate less or comparable network traffic and induces less page in and page out activity compared with existing schedulers, such as the Fair Scheduler, which may decrease the job processing times.

Map tasks generate intermediate results, which are key-value pairs, and reduce tasks fetch these results according to keys to conduct reduce functions. If the reducer and the intermediate results are not residing on the same slave node, then the intermediate results have to be transferred over the network. Distributed computing frameworks, such as Hadoop, may report the number of output bytes for each map task. Embodiments may use this information to balance the total intermediate results generated on each slave node. For example, the network traffic in the worst case may be reduced when the reducer resides on a node with fewer intermediate results and, therefore, needs to fetch many of these results from other nodes. In addition, the intermediate data from different maps that run on the same reducer also need to be merged. These sorting and merging operations take computing resources. Therefore, balancing the total size of intermediate data generated on each slave node can help to avoid the situation that one of the nodes has too much sorting and merging work, which may potentially cause long delays.

In the presence of multiple jobs, embodiments may take fairness into account when making scheduling decisions to prevent certain jobs from starving. Embodiments may be configured to associate a job.mapMin parameter with each job that functions as a weight to characterize the share of resources the job can obtain. For example, the job.mapMin parameter may be a positive integer value that indicates the minimum number of map tasks preferred for concurrent execution. Embodiments provide for a scheduler configured to launch a pre-specified number of concurrent map tasks whenever possible. However, when the cluster cannot run the suggested number of map tasks due to lack of resources, or can run more than that number in presence of abundant resources, these N(t) jobs may allocate map tasks according to job.mapMin as weights in some fair fashion. As such, the following function may operate according to embodiments to provide a measurement of the distance between the number of maps that are currently running (i.e., job.runningMaps) and job.mapMin:

$$F(x, y) = \begin{cases} e^{-x/y}, & x \geq 0 \\ 1 - 0.02x, & x < 0 \end{cases}$$

The reward contributed from the component on scheduling policies may be denoted by S according to embodiments, and, for a tunable parameter $w_1$, the following reward computation may be configured according to embodiments:

$$S \leftarrow S + w_1 \times F(\text{job.runningMaps} - \text{job.mapMin}; \text{job.mapMin}),$$

The above reward computation may be added to the total reward value computeReward(job, resource).

The promptitude characteristic may operate to minimize the average response time. The shortest remaining time first discipline serves as an example promptitude characteristic among all the work conserving disciplines. According to embodiments, promptitude may be comprised of favoring jobs with less remaining service time for extra resources after each job has run a minimum number of map tasks. A non-limiting example provides that promptitude may give priority to a first job under the condition that a second job has already launched a minimum number of concurrent map tasks. Embodiments may be configured to utilize the product of the number of remaining map tasks and the average processing time of the map task to estimate the remaining service time (denoted herein by job.remain), and to find out the maximum of these values (denoted herein by maxRemain). For example, for a tunable parameter $w_2$, promptitude may be specified according to the following:

$$S \leftarrow S + w_2 \times \exp((\text{job.remain}/\text{maxRemain})),$$

The above reward computation may be added to the total reward value computeReward(job, resource).

Within a distributed computing framework, certain schedulers may be utilized to optimize for various performance characteristics. However, it takes effort and resources to switch between candidate schedulers. Coupling Scheduler, and the reward function in particular, may be configured according to embodiments to accept tunable parameters for changing the focus of the scheduler. Illustrative and non-restrictive examples of parameters include parameters directed toward the aspects of fairness and promptitude, which may be denoted as $w_1$, $w_2$, respectively, herein. According to embodiments, the Coupling Scheduler may perform weighted processor sharing when $w_2=0$, and shortest remaining processing time first when $w_1=0$. In addition, embodiments provide for optimizing performance for given workloads through continuous adjustment of the parameters, wherein the scheduler may balance the features of the different scheduling considerations and constraints.

Figure 7:
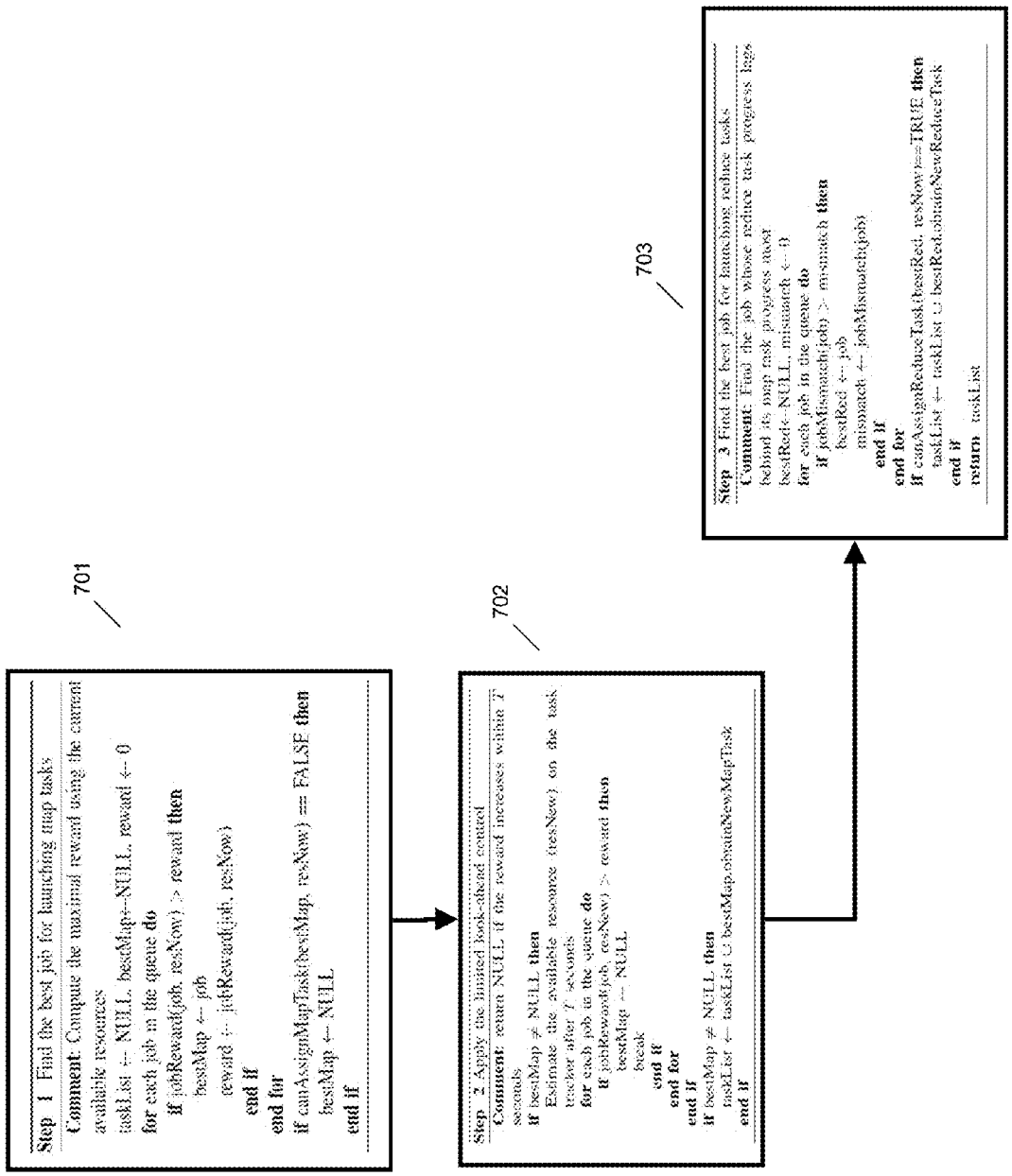
FIG. 7 provides an example process for scheduling tasks according to an embodiment.

Referring to FIG. 7, therein is provided an example process for scheduling tasks according to an embodiment. The process may be initiated by finding the best job for scheduling map tasks 701, which may include computing the reward using the current available resources. The limited lookahead policy may be applied 702 to the selected job. In the example provided in FIG. 7, the predetermined time period for estimating the available resources is 9 seconds when applying the limited lookahead policy 702. The reduce tasks may be launched 703 from the job that has the largest mismatch value, which operates, inter alia, to match the progresses of the map and reduce tasks.

Jobs may be executed on a distributed computing framework which consist of more than one stage. Embodiments provide for scheduling tasks of multi-stage jobs by matching the progresses of tasks in different stages. According to embodiments, the progresses of map and reduce tasks may be monitored and the progresses compared through a matching function such that reduce tasks may be launched depending on the progress of map tasks. For example, for the function y=ƒ(x), described above, when x percent of map tasks have completed (or started), y percent of reduce tasks may be launched. This function may repeat according to the performance and requirements of the distributed computing environment.

As tasks are executed, the performance level and availability of certain resources may fluctuate. A reward function may be configured according to embodiments that balances multiple system performance objectives under resource constraints. Embodiments provide for computing a reward based on available resources and required resources, such that an optimal job schedule may be realized which maximizes the total reward. Jobs may then be allocated in accordance with the optimal job schedule. A reward function may also be configured to contain a function designed to measure resource availability and to determine the fitness of a task within the distributed computing environment, for example, on a particular server. Embodiments may utilize a scheduling method that optimizes the total reward by using a limited lookahead policy. This scheduling method may predict the available resources at a particular time in the future, compute the new reward, and compare it to the current reward to determine whether tasks should be launched or postponed until a future time.

The description now turns to a first test case performed on a distributed computing environment using the Hadoop MapReduce framework operating with one master node and seven slave nodes, for example, all running as instances of RC2. As previously described, embodiments provide for a Coupling Scheduler configured to assign different weights to different jobs, wherein the weights may take the form of any positive value. A non-limiting example provides that the weights may be associated with the minimum number of map tasks that should run concurrently on a cluster for a job, when possible.

Two Grep jobs were run in the first test case, wherein mapSlot=4 and each job was assigned a weight of 7, such that the minimum number of map tasks to run for each job was 7. The number of map tasks that can run concurrently in the cluster is 28 (7 slave nodes with mapSlot=4). Since the two jobs have the same weight, 7, the extra available map slots may be equally distributed to them upon submission of the second job. A second test case was carried out and was configured as the first test case except that the second job was assigned a weight of 14. Referring to FIGS. 8A-8D, therein is provided graphical results of the first and second test cases, which demonstrate, inter alia, that the second job of weight 14 may run roughly twice the number of map tasks concurrently compared to the first job of weight 7.

As presented above, the Fair Scheduler is a widely used scheduling model used with Hadoop framework. An illustrative and non-restrictive example provides that a difference between the Coupling Scheduler and the Fair Scheduler is that the Fair Scheduler aggressively allocates all available reduce slots to running jobs, if possible, while the Coupling Scheduler may be configured to gradually launch reduce tasks depending on the progresses of map tasks. A third test case was performed comparing the distribution of the total processing time with Fair Scheduler and Coupling Scheduler, under the assumption that the map task service time distribution is heavy-tailed. This assumption arises, inter alia, because the file size distribution in modern data networks is shown to be heavy-tailed and the number of map tasks is proportional to the total input data size of a task. For an important class of heavy-tailed distributions, regularly varying map service time with index $-\alpha$, the job processing time distribution under Coupling Scheduler configured according to embodiments may be shown to be regularly varying with index $-\min(\alpha, 2\alpha-2)$. This is in contrast to the index $\alpha+1$ under Fair Scheduler, which is one order worse for $\alpha \geq 2$, demonstrating at least one benefit of the Coupling Scheduler. As such, gradually launching reduce tasks depending on the map task progress according to embodiments may operate to reduce the processing time distribution tail, for example, by one order.

Figure 9:
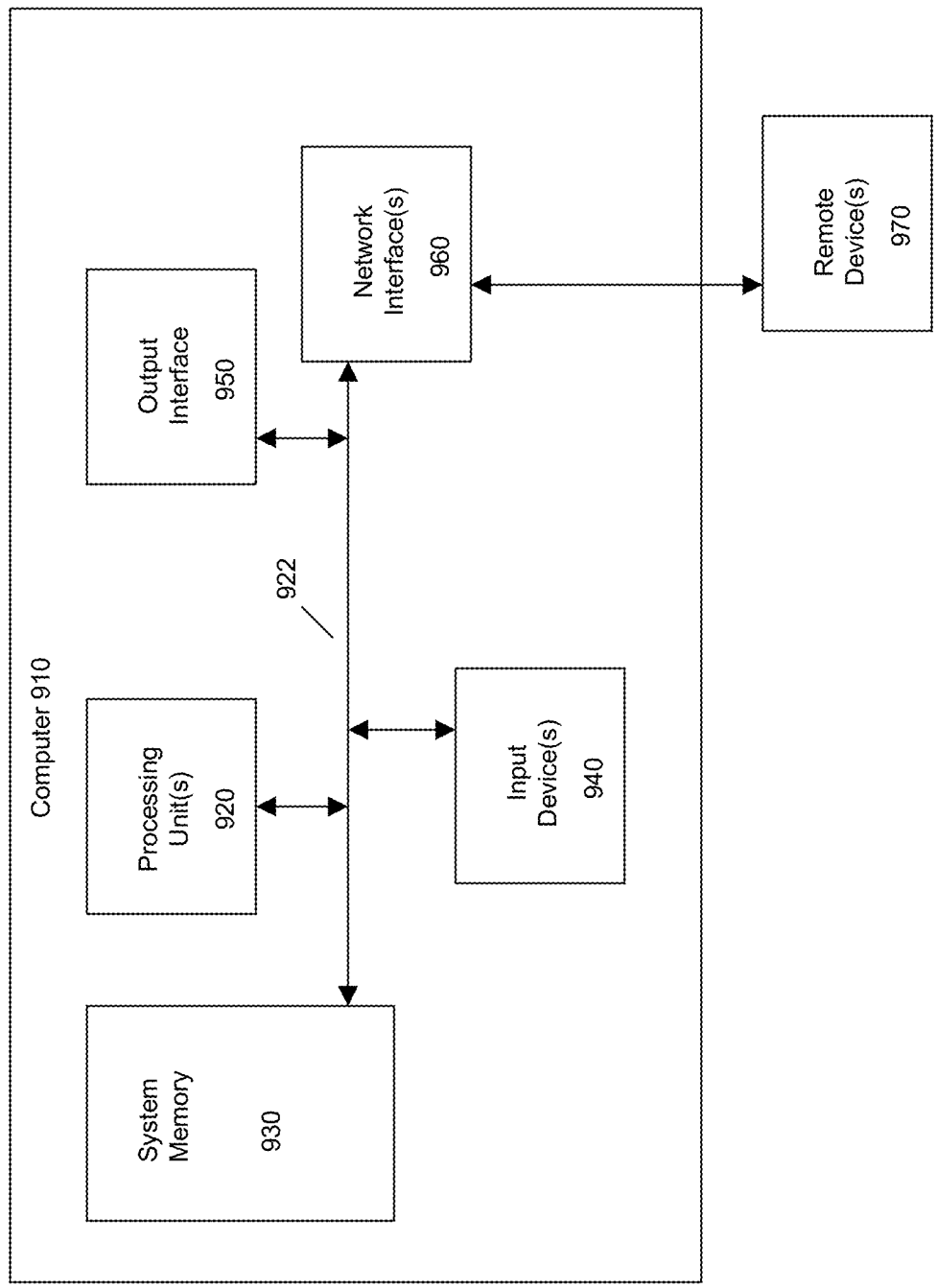
FIG. 9 illustrates an example computing device.

Referring to FIG. 9, it will be readily understood that certain embodiments can be implemented using any of a wide variety of devices or combinations of devices. An example device that may be used in implementing embodiments includes a computing device in the form of a computer 910, which may take the form of a server, a workstation computer, a mobile device, and the like. In this regard, the computer 910 may execute program instructions configured to provide predictive placement of content through network analysis, and perform other functionality of the embodiments, as described herein.

Components of computer 910 may include, but are not limited to, at least one processing unit 920, a system memory 930, and a system bus 922 that couples various system components including the system memory 930 to the processing unit(s) 920. The computer 910 may include or have access to a variety of computer readable media. The system memory 930 may include computer readable storage media in the form of volatile and/or nonvolatile memory such as read only memory (ROM) and/or random access memory (RAM). By way of example, and not limitation, system memory 930 may also include an operating system, application programs, other program modules, and program data.

A user can interface with (for example, enter commands and information) the computer 910 through input devices 940. A monitor or other type of device can also be connected to the system bus 922 via an interface, such as an output interface 950. In addition to a monitor, computers may also include other peripheral output devices. The computer 910 may operate in a networked or distributed environment using logical connections (network interface 960) to other remote computers or databases (remote device(s) 970). The logical connections may include a network, such local area network (LAN), a wide area network (WAN), a cellular network, but may also include other networks.

Those skilled in the art will recognize that aspects may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A computer program product comprising:
   a computer-readable storage medium having computer-readable program code embodied therewith, the computer-readable program code comprising:
   computer-readable program code configured to access at least one multi-stage job and at least one resource on a distributed parallel computing system;
   computer-readable program code configured to generate a current reward value based on the at least one job and a current value associated with the at least one resource;
   computer-readable program code configured to launch a first stage of at least one job, based on the current reward value;
   computer-readable program code configured to generate a prospective reward value based on the at least one job and a prospective value associated with the at least one resource at a predetermined time; and
   computer-readable program code configured to schedule a second stage of at least one job based on a comparison of the current reward value and the prospective reward value.

2. The computer program product according to claim 1, wherein the current reward value and the prospective reward value may be augmented by at least one performance characteristic.

3. The computer program product according to claim 2, wherein the at least one performance characteristic comprises fairness and promptitude.

4. The computer program product according to claim 1, wherein the at least one job comprises a signature having at least one resource requirement measurement.

5. The computer program product according to claim 4, wherein the at least one resource requirement measurement comprises CPU percentage and memory percentage.

6. The computer program product according to claim 5, further comprising:
   computer-readable program code configured to generate a job fitness value for the at least one job based on the CPU percentage and memory percentage;
   wherein the job fitness value augments the current reward value to characterize how the at least one job fits the at least one resource.

7. The computer program product according to claim 1, wherein scheduling the at least one job based on a comparison of the current reward value and the prospective reward value comprises immediately scheduling the at least one job responsive to the current reward value being greater than the prospective reward plus a tuning factor.

8. The computer program product according to claim 7, further comprising delaying a scheduling of the at least one job responsive to the prospective reward plus the tuning factor being greater than the current reward value.

9. The computer program product according to claim 1, wherein the distributed parallel computing system employs a MapReduce model.

10. The computer program product according to claim 9, wherein the at least one job comprises at least one map task and at least one reduce task.

11. The computer program product according to claim 10, wherein scheduling further comprises associating a progress corresponding with the at least one map task with a progress corresponding with the at least one reduce task.

12. The computer program product according to claim 11, wherein a percentage of the at least one reduce task is scheduled responsive to completion of the percentage of the at least one map task.

13. A method comprising:
   accessing at least one multi-stage job and at least one resource on a distributed parallel computing system;
   generating a current reward value based on the at least one job and a current value associated with the at least one resource;
   launching a first stage of at least one job, based on the current reward value;
   generating a prospective reward value based on the at least one job and a prospective value associated with the at least one resource at a predetermined time; and
   scheduling a second stage of at least one job based on a comparison of the current reward value and the prospective reward value.

14. The method according to claim 13, wherein the current reward value and the prospective reward value may be augmented by at least one performance characteristic.

15. The method according to claim 14, wherein the at least one performance characteristic comprises fairness and promptitude.

16. The method according to claim 13, wherein the at least one job comprises a signature having at least one resource requirement measurement.

17. The method according to claim 16, wherein the at least one resource requirement measurement comprises CPU percentage and memory percentage.

18. The method according to claim 17, further comprising:
generating a job fitness value for the at least one job based on the CPU percentage and memory percentage;
wherein the job fitness value augments the current reward value to characterize how the at least one job fits the at least one resource.

19. The method according to claim 13, wherein scheduling the at least one job based on a comparison of the current reward value and the prospective reward value comprises immediately scheduling the at least one job responsive to the current reward value being greater than the prospective reward plus a tuning factor.

20. The method according to claim 19, further comprising delaying a scheduling of the at least one job responsive to the prospective reward plus the tuning factor being greater than the current reward value.

21. The method according to claim 13, wherein the distributed parallel computing system employs a MapReduce model.

22. The method according to claim 21, wherein the at least one job comprises at least one map task and at least one reduce task.

23. The method according to claim 22, wherein scheduling further comprises associating a progress corresponding with the at least one map task with a progress corresponding with the at least one reduce task.

24. The method according to claim 23, wherein a percentage of the at least one reduce task is scheduled responsive to completion of the percentage of the at least one map task.

25. A system comprising:
at least one processor; and
a memory device operatively connected to the at least one processor;
wherein, responsive to execution of program instructions accessible to the at least one processor, the at least one processor is configured to:
access at least one multi-stage job and at least one resource on a distributed parallel computing system;
generate a current reward value based on the at least one job and a current value associated with the at least one resource;
launch a first stage of at least one job, based on the current reward value;
generate a prospective reward value based on the at least one job and a prospective value associated with the at least one resource at a predetermined time; and
schedule a second stage of at least one job based on a comparison of the current reward value and the prospective reward value.

* * * * *